O. ANDERSON.
NUT FOR BENCH VISES.
APPLICATION FILED NOV. 17, 1913.

1,134,937.

Patented Apr. 6, 1915.

Witnesses
A W Snowdon
G. E. Cilley

Inventor
Ola Anderson
By Ithiel J. Cilley
Attorney

UNITED STATES PATENT OFFICE.

OLA ANDERSON, OF GRAND RAPIDS, MICHIGAN.

NUT FOR BENCH-VISES.

1,134,937.          Specification of Letters Patent.          Patented Apr. 6, 1915.

Application filed November 17, 1913. Serial No. 801,553.

*To all whom it may concern:*

Be it known that I, OLA ANDERSON, a citizen of the United States, residing at Grand Rapids, in the county of Kent and State of Michigan, have invented certain new and useful Improvements in Nuts for Bench-Vises, of which the following is a specification.

My invention relates to improvements in bench vises and its objects are: First, to provide a quick acting vise that will cause the nut to engage the screw automatically by the simple forward movement of the screw, and to disengage itself by the backward movement of the screw, and, second, to provide a quick acting vise with which the action, though automatic, is absolutely positive in a vise of small initial cost.

I attain these objects by the mechanism illustrated in the accompanying drawing in which—

Figure 1:
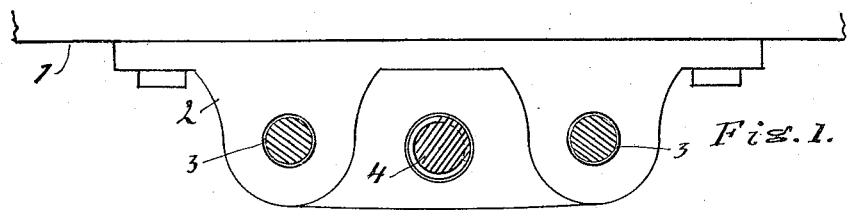
Figure 2:
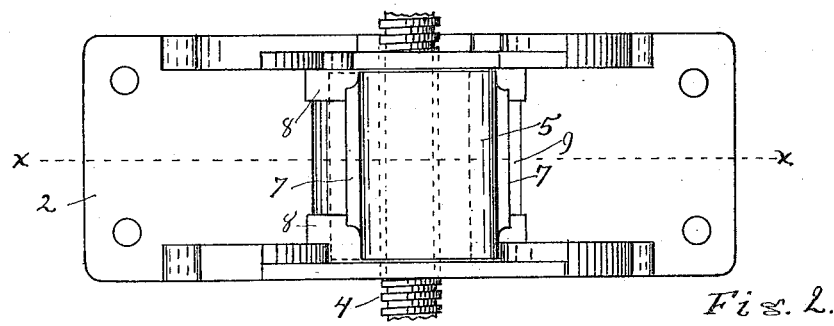
Figure 3:
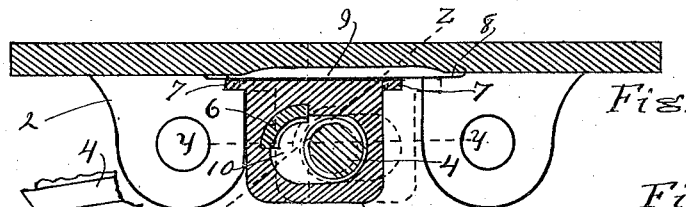
Figure 4:
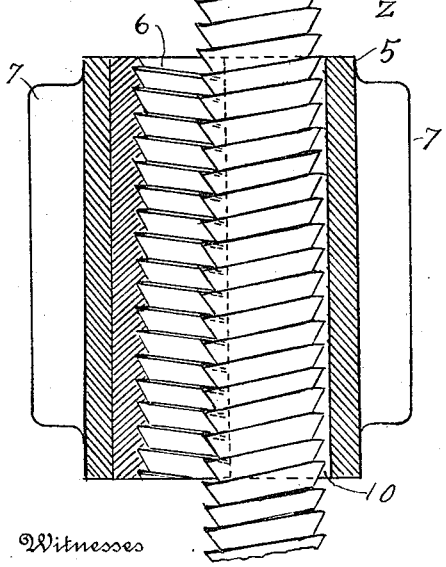

Figure 1 is an end elevation of the nut holding element and the screw. Fig. 2 is a bottom plan of the same. Fig. 3 is a sectional view of the same on the line $x\ x$ of Fig. 2. Fig. 4 is a sectional view of the nut practically on the line $y\ y$ of Fig. 3 showing the relative positions of the screw and the engaging portion of the nut. and Fig. 5 is a sectional view of the same on the line $z\ z$ of Fig. 3 showing the manner of entering and securing the engaging portion or threads of the nut in the supporting frame.

Similar letters refer to similar parts throughout the several views.

My invention consists of a supporting frame 2 made of any available metal, preferably of cast iron, and having depending sides that are provided with openings for the reception of the screw 4 and the guides 3, substantially as shown in Figs. 1 and 3, and also with slideways 8 for the nut frame 5 to be guided by to hold it in proper position when being carried to and from contact with the screw 4. I prefer that a depression 9 be made in the base of the frame between the bearings or slideways 8 so that there will be no danger of the center portion of the nut frame bearing upon the base of the supporting frame. This supporting frame is bolted to the lower surface of the bench top 1, as indicated in Fig. 1 so that the nut frame 5 rests upon the upper surface of the bench screw 4. The nut frame is made of practically the form shown in Figs. 2 and 3, having an oblong opening 10 through it longitudinally and in the upper left hand corner thereof I insert a segment of metal with screw threads formed on its concave surface in position so that when the screw 4 is turned to the right the nut frame will be carried to the right thereby until the screw threads on the screw enter between the screw threads on the segment when the vise will be made to operate to clamp any article that may be placed between its jaws, and if the screw is turned to the left the nut will be loosened by the backing up of the screw and the nut frame will be carried to the left and the threads on the screw will be disengaged from the threads on the segment and the screw may be readily slid longitudinally through the nut without danger of engaging the threads on the segment until the screw has been again turned to the right. That the nut frame may be properly balanced on the screw 4 I find it desirable to place a narrow projecting bearing 7 on each side at the base and in position to bear upon the bearings 8 8, the distance between the surface of the screw when in position in the supporting frame and the surface of the bearings 8 8 being just sufficient to allow the nut frame to move freely but not to incline to any perceptible extent.

Figure 5:
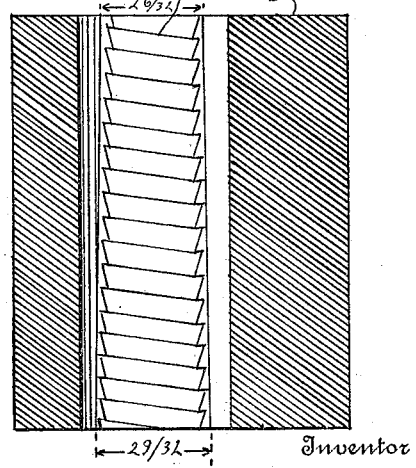

For the purpose of forming a perfect bearing the entire length of the segment, and of rendering it impossible to draw it through the nut frame when screwing or clamping an article between the jaws of the vise I make said segment tapering, as, for instance, in Fig. 5 I have shown one end of segment as being 26/32 of an inch wide and the other end as being 29/32 of an inch, the narrow end of the segment being at the draw end.

While an ordinary square threaded screw, as shown in Fig. 2, may be used with good results I greatly prefer to have the threads formed substantially as indicated in Figs. 4 and 5, as with this construction the threads may be made to engage much more readily than square threads would do, and when disengaged there is positively no danger of the screw coming in contact with the segment and bothering about passing the screw back rapidly as the inclines on the backs of the teeth absolutely prevent engagement, so that the action, whether when engaged or disengaged is much more positive and satisfactory than would be possible with square-threaded screws.

The dotted outline of the nut frame 5 in Fig. 3 indicate the position assumed by this frame when the segment 6 and the screw 4 are in engagement, it being understood that the screw is positively anchored in one position, and that the nut frame is made to rest its entire weight on the screw so that any movement of the screw when revolving to the right or to the left will carry the nut frame to the right or to the left with it, as and for the purposes hereinbefore described.

It is to be noted that the opening 10 through the nut frame 5 is so formed that the screw 4, when engaging the screw threads on the segment 6 rests its full weight upon the lower wall of the nut frame with just space enough to insure the full engagement of the screw threads and avert the possibility of their becoming disengaged until the segment has been carried over from the screw by turning the screw backward for releasing the vise jaws from clamping whatever may be between them.

What I claim as new and desire to secure by Letters Patent of the United States, is:

1. In combination with a bench vise screw, a supporting frame fitted to receive the vise screw, and prevent lateral movement thereof, a laterally movable nut frame supported on said screw and having an oblong opening for the reception of the screw, and a screw threaded segment anchored in one corner of the nut frame in position to be made to engage with, and to disengage from the threads of the screw as the screw is turned to the right or to the left respectively.

2. In combination with the screw of a bench vise, backwardly inclined threads formed thereon with the faces perpendicular and the backs inclined from the point of one perpendicular face to the base of the next perpendicular face, a supporting frame, a laterally movable nut frame supported on said screw in said supporting frame, said nut frame having an oblong opening through it longitudinally for the free passage of the screw therethrough, and a segment in the nut frame having screw threads formed thereon to mesh perfectly with the threads on the screw, forwardly inclined screw threads thereon, all so arranged that the revolving of the screw to the right or to the left will cause the nut frame to move to the right or to the left and engage or disengage the screw threads on the screw and the segment, respectively.

3. In combination with the screw of a bench vise, having a direct longitudinal movement only, a supporting frame having slideways thereon, a nut frame mounted in said supporting frame and supported on the screw, said nut frame having an oblong opening through it longitudinally to allow it to have free lateral movement, a segment made tapering and anchored in a groove in the upper left hand corner of the nut frame, said nut frame having bearings to engage with the bearings on the supporting frame and be made to move to the right or to the left as the screw is being correspondingly turned to engage and disengage the screw and segment.

Signed at Grand Rapids, Michigan, November 12, 1913.

OLA ANDERSON.

In presence of—
  CHAS. V. HILDING,
  I. J. CILLEY.

Copies of this patent may be obtained for five cents each, by addressing the "Commissioner of Patents, Washington, D. C."